United States Patent [19]
Kelly et al.

[11] Patent Number: 5,509,213
[45] Date of Patent: Apr. 23, 1996

[54] PICTURE HANGER AID AND ALIGNING DEVICE

[76] Inventors: Mary H. Kelly, 507 Chase St., Park Forest, Ill. 60466; Malcolm T. Kelly, 3112 W. 100th Pl., Evergreen Park, Ill. 60642; John Kelly, 221 E. Market St., P.O. Box 263, Iowa City, Iowa 52245

[21] Appl. No.: 183,745

[22] Filed: Jan. 21, 1994

[51] Int. Cl.$^6$ ........................................ G01B 5/00
[52] U.S. Cl. ................... 33/613; 33/474; 33/451
[58] Field of Search ........................... 33/613, 644, 429, 33/451, 474, 478, 479, 484, 485

[56] References Cited

U.S. PATENT DOCUMENTS

| | | | |
|---|---|---|---|
| D. 282,054 | 1/1986 | Hoffman | 33/613 X |
| 868,700 | 10/1907 | Roberts | 33/451 |
| 1,002,734 | 9/1911 | Morse | 33/474 |
| 3,516,165 | 6/1970 | Pfeffer . | |
| 3,530,591 | 9/1970 | Moffitt . | |
| 4,220,309 | 9/1980 | Eisen et al. | 248/542 |
| 4,241,510 | 12/1980 | Radecki . | |
| 4,382,337 | 5/1983 | Bendick . | |
| 4,413,421 | 11/1983 | Siniuk . | |
| 4,443,949 | 4/1984 | Newton . | |
| 4,455,756 | 6/1984 | Greene . | |
| 4,485,561 | 12/1984 | Hopkins, Sr. . | |
| 4,512,084 | 4/1985 | Lieberman . | |
| 4,637,583 | 1/1987 | Babitz | 248/544 |
| 4,648,185 | 3/1987 | Brandimarte | 33/451 X |
| 4,893,776 | 1/1990 | Floyd | 248/475.1 |
| 5,103,573 | 4/1992 | Ehling et al. | 33/613 |
| 5,103,574 | 4/1992 | Levy | 33/760 |
| 5,109,611 | 5/1992 | Houck | 33/613 |
| 5,180,135 | 1/1993 | Hindall | 248/544 |

Primary Examiner—William A. Cuchlinski, Jr.
Assistant Examiner—G. Bradley Bennett
Attorney, Agent, or Firm—Popham, Haik, Schnobrich & Kaufman, Ltd.

[57] ABSTRACT

A picture hanger aligning device and method for locating and aligning one or more picture hangers on a wall. An elongated, vertical center member and an elongated horizontal member having hooks protruding outwardly therefrom are connected in a triangular fashion by two elongated side members. A picture is hung from hooks on the horizontal member or, alternatively, from a hook on the vertical member, and held in a desired position against a wall. The position of a scribe hole in the vertical member is marked by inserting a marking utensil through the scribe hole, the picture is removed from the device, and the device is held against the wall in the desired position by aligning the scribe hole with the corresponding mark on the wall. The position of the hooks from which the picture is hung is then marked on the wall by inserting a writing utensil through scribe holes associated with the hooks. Hangers can then be inserted in the wall at the aligned positions of the wall marks, resulting in aligned picture hangers from which the picture can be hung.

21 Claims, 8 Drawing Sheets

PICTURE HANGER AID AND ALIGNING DEVICE

BACKGROUND OF THE INVENTION

1. Field of the Invention

The present invention relates to a device and method to aid in hanging objects. More specifically, the invention relates to a device and method for aligning hangers to aid in hanging objects such as pictures, mirrors, or any other type of wall hanging.

2. Related Art

U.S. Pat. No. 5,180,135 to Hindall discloses a picture hanger locating device for marking a desired location on a wall for a single picture hanger. The device supports a picture and includes an alignment gage to align a positioning arm with a vertical or horizontal line on a wall. An integral marker is provided to mark the desired location for a single hanger.

U.S. Pat. No. 5,103,574 to Levy shows a measuring tool for hanging pictures including a box-shaped housing attached to a mechanism for ascertaining whether the housing is in horizontal and vertical alignment with respect to a wall and a level instrument, such as a bubble level. A tape measure is built into the housing for marking linear measurements. The tool does not include hangers from which a picture can be hung to locate a desired position for the picture on the wall.

U.S. Pat. No. 4,443,949 to Newton illustrates a picture hanging template for locating and marking aligned positions on a picture frame and a wall for locating and aligning two specially adapted two-part picture fasteners on the frame and the wall.

U.S. Pat. No. 4,241,510 to Radecki shows an inverted T-shaped device for hanging pictures. A picture is secured to the device to determine desired positions for hangers, the picture is removed from the device, and the device is then held against a wall to mark positions for hangers.

U.S. Pat. No. 4,220,309 to Eisen et al. discloses an elongated body that releasably attaches to a wall for hanging a picture from a single hanger. A picture is hung from the elongated body, and the position for a single hanger is marked on the wall through a hole in the elongated body.

U.S. Pat. No. 3,530,591 to Moffitt discloses a picture hanging aid including one or more picture hanging hooks secured to a rectangular board. The picture must first be hung from the board, then removed from the board and held against a wall in a desired location. Masking tape is used to mark the location of the picture on the wall and the board is then held against the tape to mark hook locations on the wall.

Most known picture hanging aids are directed to locating a position for a single hanger on a wall. Such devices are not useful for hanging large, heavy objects requiring use of two or more hangers to be securely hung. Prior art devices directed to locating two hangers generally are complex and do not allow simple alignment of all types of hangers on a wall. Therefore, it is desirable to provide a simple device and method for locating and aligning one or more hangers of any type on a wall.

SUMMARY OF THE INVENTION

In a first embodiment, the present invention provides a device for locating and aligning one or more hangers on a wall. Preferably, the device includes an elongated vertical center member with a scribe hole approximately one quarter the distance from its top end and a handle extending outwardly from its front face at its top end, and an elongated horizontal member with a plurality of hooks extending outwardly and upwardly from the front face of the horizontal member and spaced equidistant from each other along the length of the horizontal member. A scribe hole is associated with each hook at the top of each hook. A pair of elongated side members are connected to the vertical member and the horizontal member so that the vertical, horizontal, and side members are connected in a triangular fashion.

In a first alternate embodiment of the first embodiment of the invention, either the horizontal member or the vertical member includes a hole configured to receive a bubble level. The hole can be positioned either to the left or to the right of the center of the horizontal member, or above or below, preferably below, the center of the vertical member. A bubble level configured to fit inside the hole can be inserted into the hole so that it fits snugly and securely therein to aid in determining aligned hanger positions on a horizontal plane with respect to a flat vertical plane, such as a wall.

The first embodiment of the invention further provides a method for locating and aligning one or more hangers on a wall utilizing the inventive device. Preferably, an object, such as a picture, mirror, or other object to be hung, is hung from hooks on the horizontal member according to its size, the device is held by the handle and placed against a wall at a desired location, and the position of the vertical member's scribe hole is marked on the wall by inserting a marking utensil through the scribe hole. The object is then removed from the hooks and the device is held against the wall in the desired location by aligning the vertical member scribe hole with the mark on the wall. Aligned hanger locations are then marked on the wall by inserting a marking utensil through scribe holes in the horizontal member associated with the hooks from which the object was hung. Any type of hanger can then be attached to the wall at the location of each of the marks corresponding to the hooks of the horizontal member, resulting in aligned hangers from which the object can be hung.

In a second alternate embodiment of the first embodiment of the invention, aligned hanger positions can be determined using a molded-in ruler on the bottom edge of the horizontal member to locate and mark aligned hanger positions on the wall.

In a second embodiment, the preferred device further includes a rectangular dual hook extending outwardly from the front face of the vertical member at approximately one-quarter the distance from the bottom end of the vertical member. The dual hook includes an upper end extending outwardly and upwardly from the front face of the vertical member, forming an upper hook from which an object can be hung, and a bottom end extending outwardly and downwardly from the front face of the vertical member, forming a lower hook from which an object can be hung when the device is inverted, and upper and lower scribe holes associated with the upper and lower hooks, respectively.

In a first alternate embodiment of the second embodiment of the invention, either the horizontal or the vertical member includes a hole with a bubble level inserted therein, as discussed above in relation to the first alternate embodiment to the first embodiment of the invention.

Preferably, to hang an object close to a ceiling or in a tight space according to the second embodiment, the device is inverted, the object is hung from the lower hook of the dual hook, the device is held by the handle and placed against a wall in a desired location, and the position of the vertical member's scribe hole is marked on the wall by inserting a marking utensil through the scribe hole. The object is then removed from the hook, the device is placed against the wall in the desired location by aligning the scribe hole with the mark on the wall, and the position of the lower scribe hole associated with the lower hook is marked on the wall by inserting a marking utensil through the scribe hole associated with the lower hook of the dual hook. A hanger can then be attached to the wall at the location of the mark corresponding to the position of the lower scribe hole.

In a second alternate embodiment of the second embodiment, aligned hanger positions can be determined and marked on the wall by marking positions of selected scribe holes associated with the hooks on the horizontal member on the wall.

In a third alternate embodiment of the second embodiment, aligned hanger positions can be determined using a molded-in ruler on the bottom edge of the horizontal member to locate and mark aligned hanger positions on the wall.

In a third embodiment, the invention provides a device for locating a single hanger on a wall preferably including a vertical member having a scribe hole approximately one-quarter the distance from its top end, a handle extending outwardly from its front face at its top end, a triangular hook from which a picture can be hung extending outwardly and upwardly from its front face at approximately one-quarter the distance from its top end, and a scribe hole associated with the hook at the top of the hook.

In a first alternate embodiment of the third embodiment, either the horizontal member or the vertical member includes a hole configured to receive a bubble level and a bubble level inserted therein to aid in determining aligned hanger positions on a horizontal plane with respect to a flat vertical plane, such as a wall, as discussed above in relation to the first and second embodiments of the invention.

Preferably, to hang an object according to the third embodiment of the invention, the object is hung from the hook on the vertical member, the device is held by the handle and placed against a wall at a desired location, and the position of the vertical member's scribe hole is marked on the wall by inserting a marking utensil through the scribe hole. The object is then removed from the hook, the device is held against the wall in the desired position by aligning the vertical member's scribe hole with the mark on the wall, and the position of the scribe hole associated with the hook from which the object was hung is marked on the wall by inserting a marking utensil through the scribe hole. A hanger is then attached to the wall at the location of the mark.

In a second alternate embodiment of the third embodiment, the vertical member includes a rectangular dual hook extending outwardly from its front face at approximately one-quarter the distance from its bottom end. The hook includes an upper end extending outwardly and upwardly from the front face of the vertical member to form an upper hook from which an object can be hung, a lower end extending outwardly and downwardly from the front face of the vertical member to form a lower hook from which an object can be hung when the device is inverted, and upper and lower scribe holes located above and below the upper and lower hooks of the dual hook, respectively. To hang an object, the device is inverted, the object is hung from the bottom hook of the dual hook, and the desired hanger position is located and marked, as described above.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The invention is described below with reference to the orientation of FIGS. 1 through 21.

Figure 1:
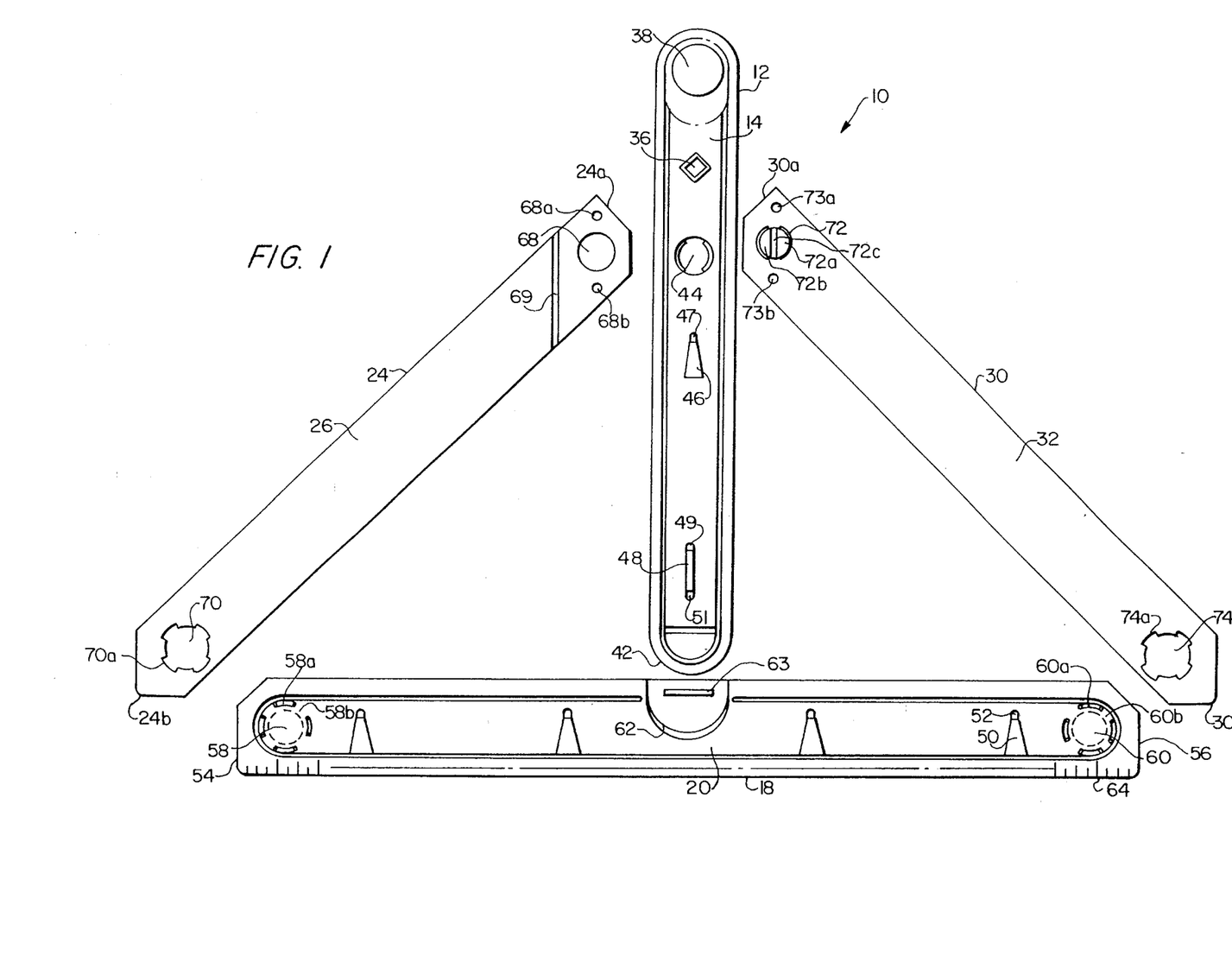
FIG. 1 illustrates an exploded front view of the inventive hanger aligning device prior to assembly.
Figure 3:
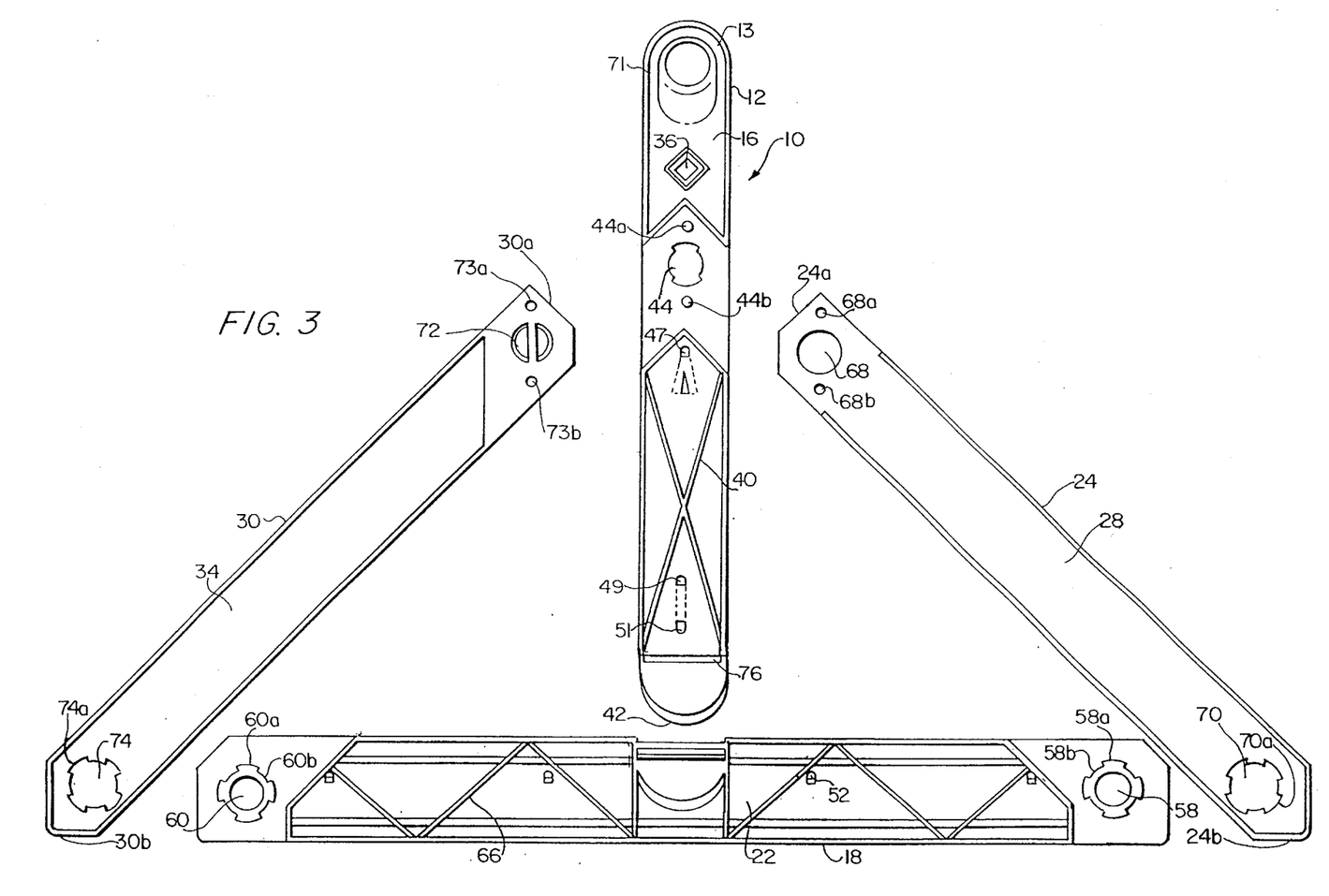
FIG. 3 illustrates an exploded rear view of the inventive hanger aligning device prior to assembly.
Figures 4, 5, 6, 7:
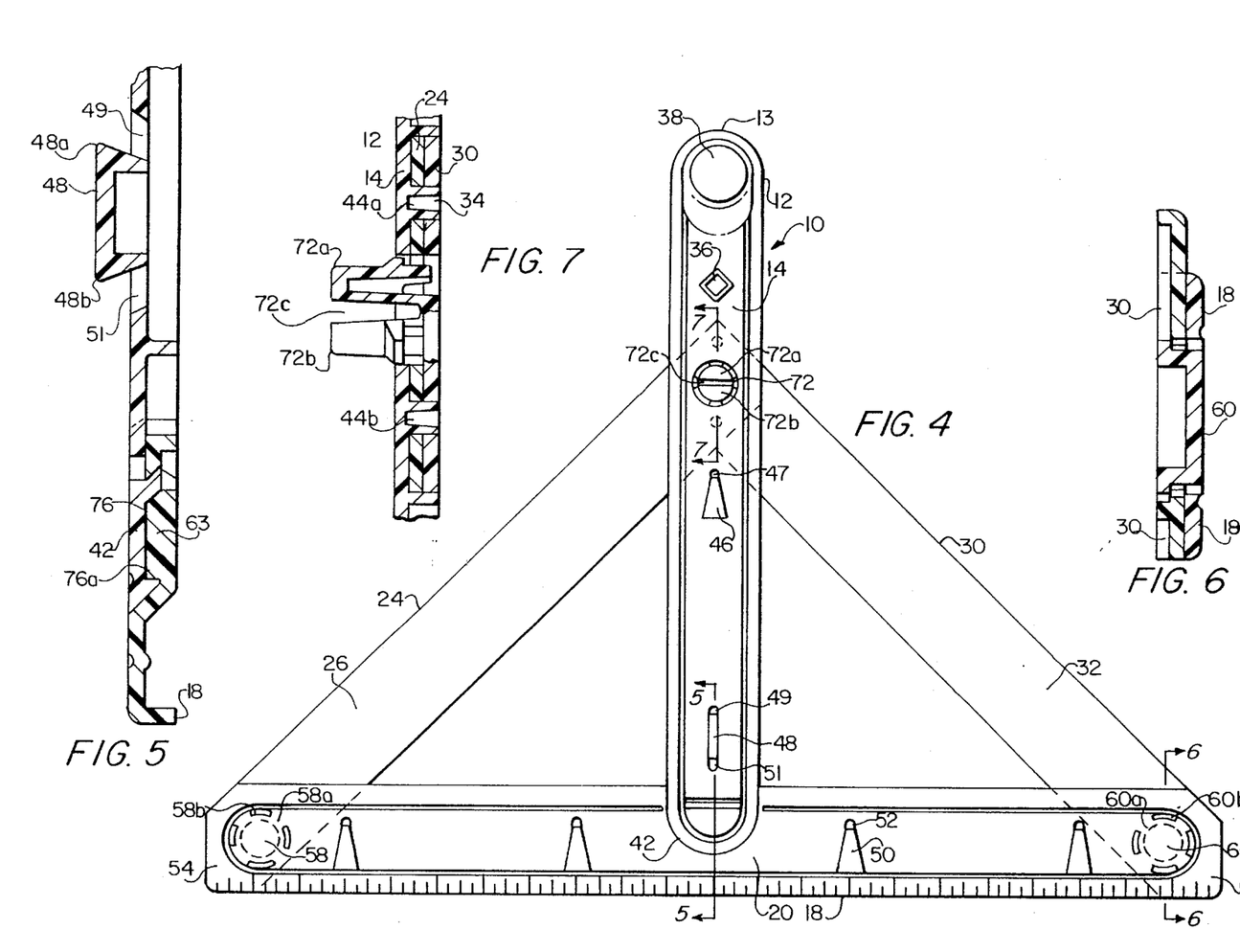
FIG. 4 illustrates a front view of the assembled hanger aligning device.
FIG. 5 illustrates a cross-sectional view taken along line 5—5 of FIG. 4.
FIG. 6 illustrates a cross-sectional view taken along line 6—6 of FIG. 4.
FIG. 7 illustrates a cross-sectional view taken along line 7—7 of FIG. 4.
Figures 8, 9:
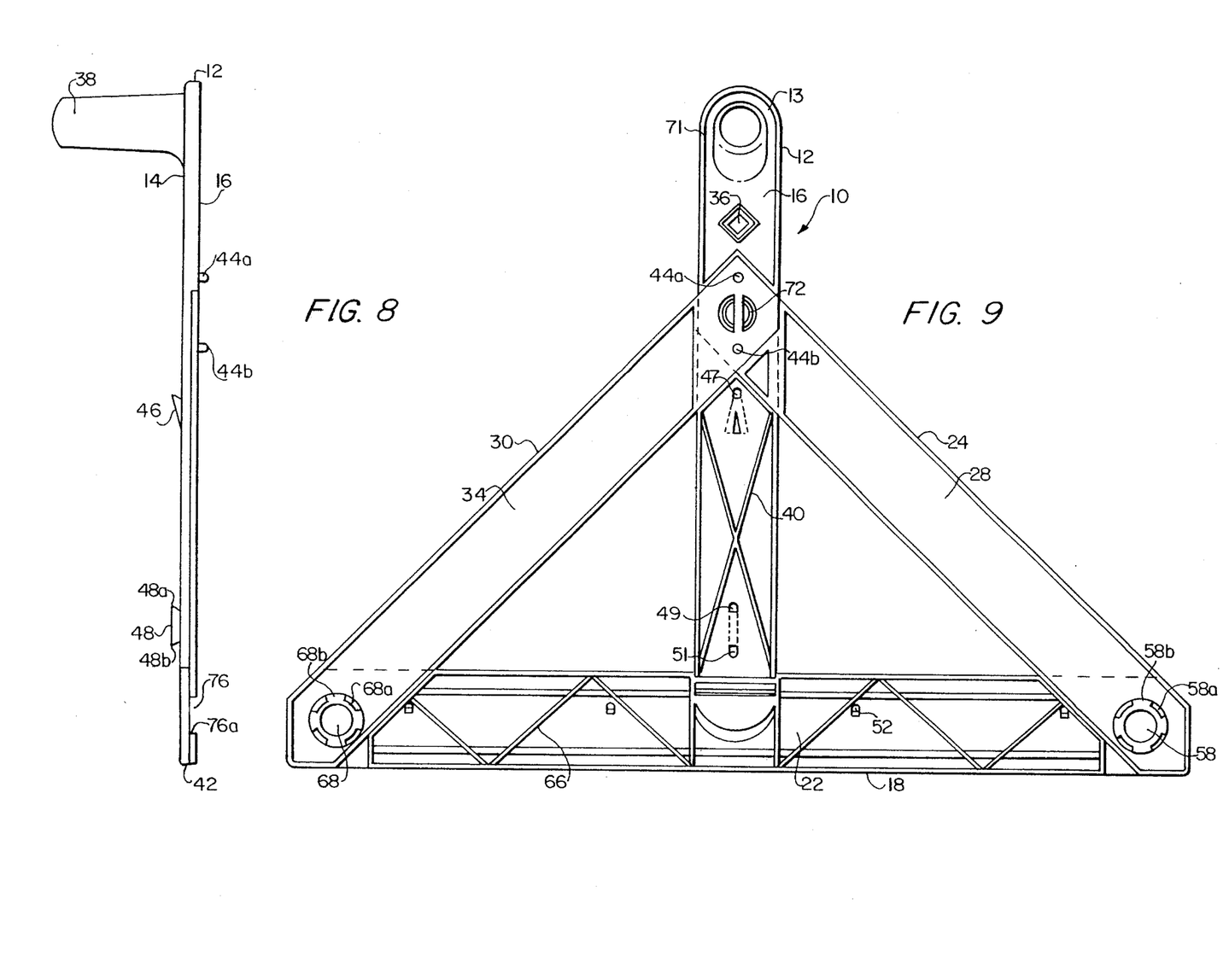
FIG. 8 illustrates a side view of the vertical member of the hanger aligning device.
FIG. 9 illustrates a rear view of the assembled hanger aligning device.

As shown in FIGS. 1, 3, and 8, the first embodiment of the inventive picture hanger aligning device 10 includes vertical member 12 having a front face 14 and a rear face 16, horizontal member 18 having a front face 20 and a rear face 22, and left and right side members 24, 30 having front faces 26, 32 and rear faces 28, 34, respectively. When device 10 is assembled, side members 24, 30 connect vertical member 12 and horizontal member 18 in a triangular fashion, as shown in FIGS. 4 and 9.

Referring now to FIGS. 1, 3, 5, 8, and 9, vertical member 12 preferably has a scribe hole 36 located approximately one-quarter the distance from its top end 13 for marking the position of vertical member 12 on a wall. Preferably, vertical member 12 includes a knob 38 extending outwardly from its front face 14 at its top end 13 to allow easy handling of device 10 during use. Vertical member 12 also has a semi-circular bottom 42 and is connected to left and right side members 24, 30 through hole 44, located approximately one-third the distance from top end 13 of vertical member 12, discussed in detail below. Pins 44a, 44b extend outwardly from rear face 16 of vertical member 12 above and below hole 44, respectively, for engaging holes 68a, 68b in left side member 24 and holes 73a, 73b in right side member 30, respectively. Pins 44a, 44b are provided to relieve pressure from locking member 72 on right side member 30 when device 10 is assembled, as discussed in detail below.

Figure 2A:
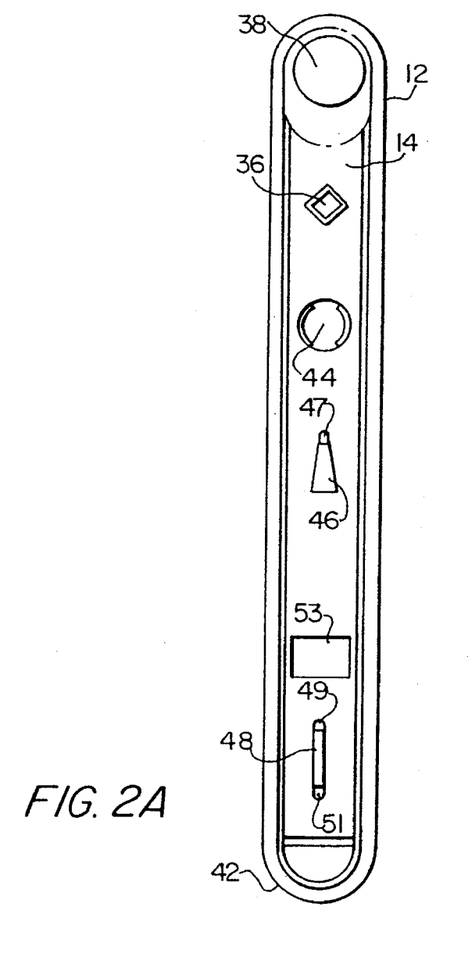
FIG. 2a illustrates a front view of an alternate embodiment of the vertical center member wherein it includes a hole configured to receive a bubble level.
Figure 2B:
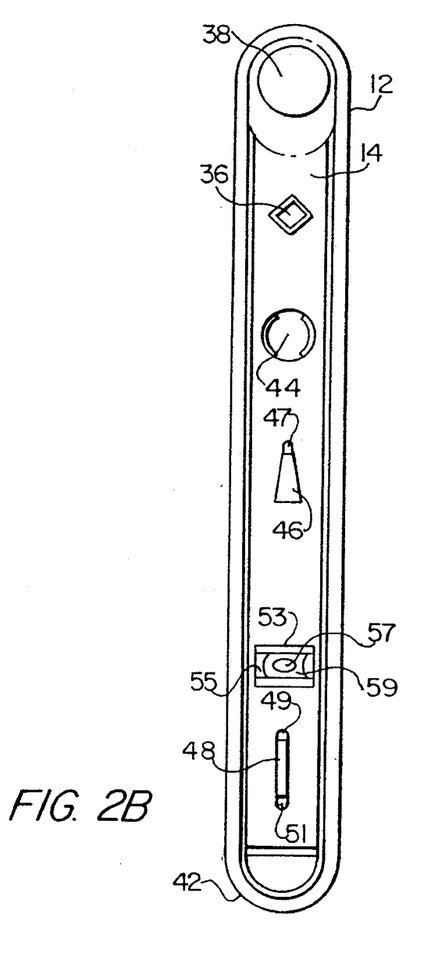
FIG. 2b illustrates a front view of the alternate embodiment of the vertical member wherein a bubble level is inserted in the hole configured to receive a bubble level.
Figure 2C:
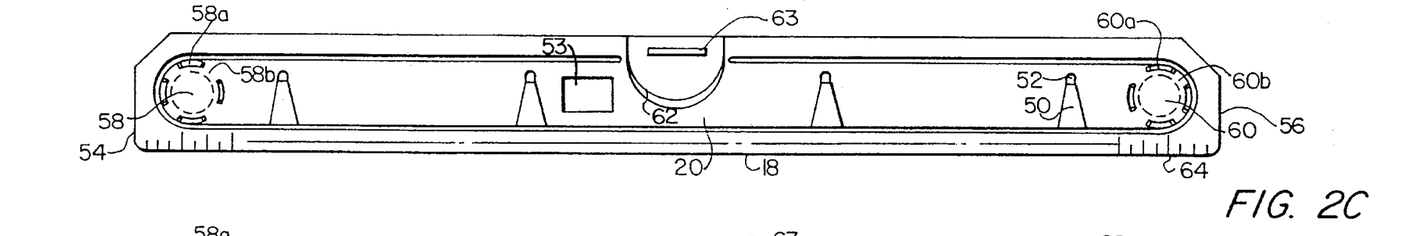
FIG. 2c illustrates a front view of the alternate embodiment of the horizontal member wherein it includes a hole configured to receive a bubble and positioned to the left of the center of the horizontal member.
Figure 2D:
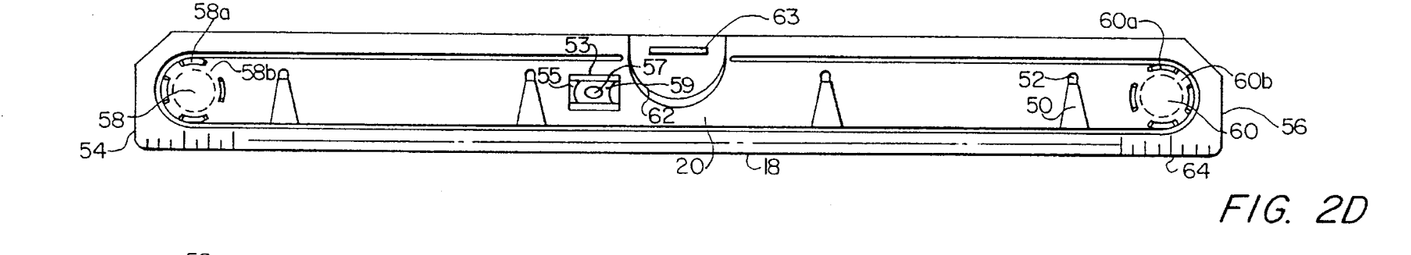
FIG. 2d illustrates a front view of the alternate embodiment of the horizontal member wherein a bubble level is inserted in the hole configured to receive a bubble level and positioned to the left of the center of the horizontal member.
Figure 2E:
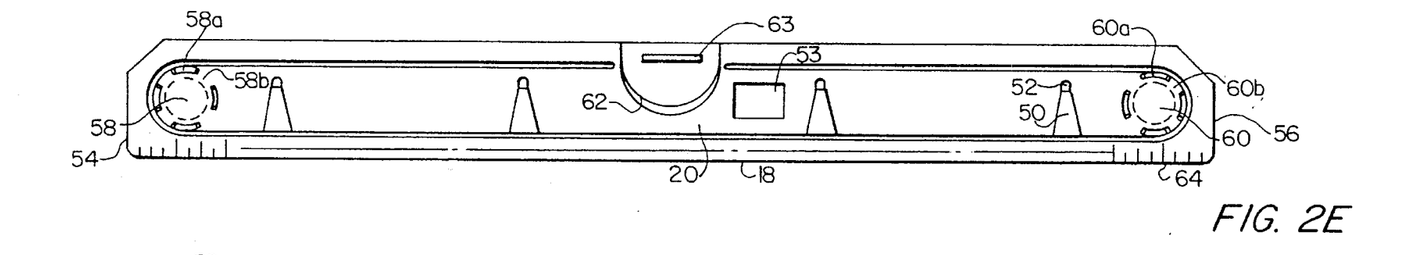
FIG. 2e illustrates a front view of the alternate embodiment of the horizontal member wherein it includes a hole configured to receive a bubble and positioned to the right of the center of the horizontal member.
Figure 2F:
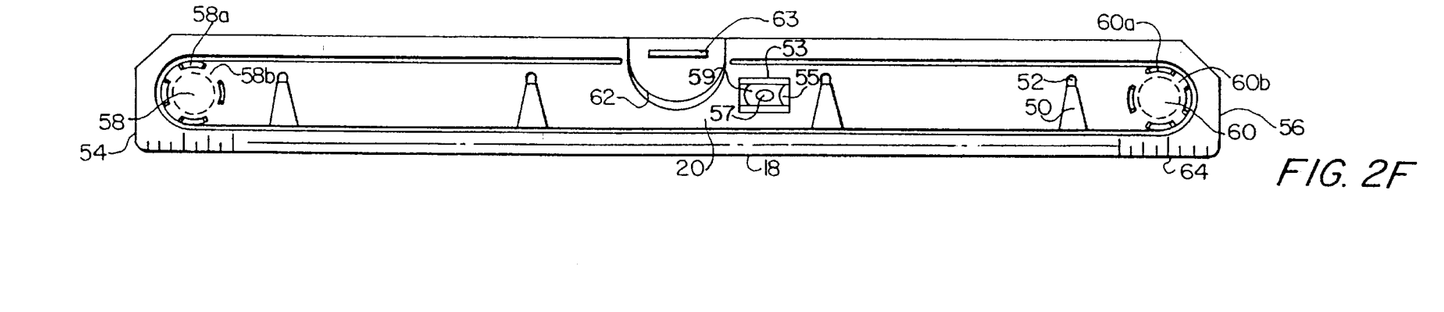
FIG. 2f illustrates a front view of the alternate embodiment of the horizontal member wherein a bubble level is inserted in the hole configured to receive a bubble level and positioned to the right of the center of the horizontal member.

According to the first alternate embodiment of the first embodiment, as shown in FIGS. 2a and 2b, front face 14 of vertical member 12 includes a hole 53 located either above or below, preferably below as shown in FIGS. 2a and 2b, the center of vertical member 12 and configured to receive an alignment mechanism, such as a bubble level 55. Bubble level 55 can be inserted into hole 53 so that bubble level 55 fits snugly and securely inside hole 53. Bubble level 55 can then be used to aid in determining aligned hanger positions on a horizontal plane with respect to a flat vertical plane, such as a wall, by positioning device 10 against a wall such that an air bubble 57 moves to a center window 59. Movement of air bubble 57 to center window 59 indicates that device 10 is set on a horizontal plane with respect to the wall.

Rear face 16 of vertical member 12 includes a raised edge 71, a notch 76 having a sharp edge 76a located near its semi-circular bottom 42, and raised ribs 40 for added structural support. Raised edge 71 is configured to engage an indentation 69 in left side member 20 and notch 76 and sharp edge 76a are configured to engage raised lip 63 located along the top edge of semi-circular indentation 62 of horizontal member 18 to provide structural support when device 10 is assembled.

Triangular upper hook 46, located at the approximate center of vertical member 12, and rectangular lower dual hook 48, located at approximately one-quarter the distance from circular bottom 42 of vertical member 12, extend outwardly from front face 14 of vertical member 12 for use in the second and third embodiments of the invention, discussed in detail below. Referring now to FIG. 7, triangular upper hook 46 is a triangular shaped protrusion extending outwardly and upwardly from front face 14 of vertical member 12 from which a picture or other object can be hung. Referring now to FIG. 4, rectangular lower dual hook 48 is a rectangular-shaped protrusion with an outwardly and upwardly extending upper end forming upper hook 48a from which a picture or other object can be hung and an outwardly and downwardly extending lower end forming lower hook 48b from which a picture or other object can be hung when device 10 is inverted. Scribe hole 47 is associated with upper hook 46 above upper hook 46. Upper and lower scribe holes 49, 51 are associated with upper hook 48a and lower hook 48b of dual hook 48 above and below upper hook 48a and lower hook 48b, respectively.

As shown in FIGS. 1, 3, 4, and 9, horizontal member 18 preferably includes a plurality of hooks 50 from which a picture or other object can be hung. Hooks 50 are spaced equidistant from each other along the length of horizontal member 18 and extend outwardly and upwardly from front face 20 of vertical member 12 so that a picture can be hung therefrom. Scribe holes 52 are associated with each hook at the top of each hook. Left and right ends 54, 56 of horizontal member 18 contain left and right locking members 58, 60, respectively. Preferably, left and right locking members 58, 60 are pivot locks.

A semi-circular indentation 62 is located at the center of horizontal member 18 and is configured to receive semi-circular bottom 42 of vertical member 12 when device 10 is assembled, so that upper face 14 of vertical member 12 is flush with upper face 20 of horizontal member 18 when device 10 is assembled, as shown in FIG. 3. Raised lip 63 is provided at the top of semi-circular indentation 62 to engage notch 76 and sharp edge 76a of vertical member 12 to provide structural support to device 10 when assembled.

Preferably, horizontal member 18 has a molded-in ruler 64 along the bottom edge of its front face 20. Rear face 22 of horizontal member 18 preferably includes raised ribs 66 to give added strength to device 10.

According to the first alternate embodiment of the first embodiment, as shown in FIGS. 2c–2f, horizontal member 18 includes a hole 53 located either to the left or to the right of the center of horizontal member 18 and configured to receive an alignment mechanism, such as a bubble level 55. As described above in relation to the description of vertical member 12, bubble level 55 can be inserted into hole 53 so that bubble level 55 fits snugly and securely therein. Bubble level 55 can be used to aid in determining aligned hanger positions on a horizontal plane with respect to a flat vertical plane, such as a wall, by positioning device 10 against a wall such that an air bubble 57 moves to a center window 59, indicating that device 10 is located on a horizontal plane with respect to the wall.

Left side member 24 includes a hole 68 at its top end 24a configured to engage locking member 72 at the top end 30a of right side member 30. Indentation 69 at top end 24a of left side member 24 is configured to engage raised edge 71 on rear face 16 of vertical member 12 when device 10 is assembled to provide structural support.

Hole 44 of vertical member 12 is also configured to engage locking member 72 of right side member 30.

Additionally, holes 68a, 68b located above and below hole 68 of left side member 24, respectively, and holes 73a, 73b located above and below locking member 72 of right side member 30, respectively, are configured to engage pins 44a, 44b, extending outwardly from rear face 16 of vertical member 12 and located above and below hole 44 of vertical member 12, respectively.

Preferably, locking member 72 is a spring lock with first and second flexible tabs 72a, 72b extending outwardly from front face 32 of right side member 30. When first and second flexible tabs 72a, 72b are in a normal resting position, a space 72c is located between tabs 72a, 72b.

Left and right side members 24, 30 include holes 70, 74, at their bottom ends 24b, 30b, respectively. Holes 70, 74 are configured with outwardly extending notches 70a, 74a to receive left and right locking members 58, 60 on horizontal member 18, respectively.

Preferably, left and right locking members 58, 60 are pivot locks having a notched configuration that includes outwardly extending notches 58a, 60a, respectively, corresponding to outwardly extending notches 70a, 74a of left and right side members 24, 30, respectively, and inwardly extending tabs 58b, 60b configured to capture notches 70a, 74a when holes 70, 74 are slid over locking members 58, 60, respectfully, and left and right side members are pivoted approximately 45° toward horizontal member 18.

As shown in FIGS. 4, 5, 6, 7, and 9, when device 10 is assembled, left and right side members 24, 30 are connected to horizontal member 18 by engaging holes 70, 74 with left and right locking members 58, 60, respectively. Notches 70a of hole 70 of left side member 24 are aligned with outwardly extending notches 58a of locking member 58 between inwardly extending tabs 58b, left side member 24 is pressed into place below inwardly extending tabs 58b, and then left side member 24 is pivoted approximately 45° toward horizontal member 18 so that inwardly extending tabs 58b capture notches 70a of hole 70, thereby locking left side member 24 in place.

Right side member 30 is then connected to horizontal member 18 by aligning notches 74a of hole 70 over outwardly extending notches 60a of locking member 60, pressing right side member 30 into place below inwardly extending tabs 60b, and then pivoting right side member 30 approximately 45° toward horizontal member 18 so that inwardly extending tabs 60b capture notches 74a of hole 74, thereby locking right side member 24 in place.

Left side member 24 is then connected to right side member 30 by pressing flexible tabs 72a, 72b of locking member 72 together, sliding hole 68 of left side member 24 over tabs 72a, 72b and locking left side member 24 rigidly in place by pressing left side member 24 so that hole 68 is captured by tabs 72a, 72b of locking member 72 when they return to their normal resting position.

Then, semi-circular bottom 42 of vertical member 12 is placed in semi-circular indentation 62 of horizontal member 18 so that notch 76 and sharp edge 76a of vertical member 12 engage raised lip 63 of horizontal member 18 to provide structural support to device 10.

Hole 44 of vertical member 12 is then engaged with locking member 72 by pressing flexible tabs 72a, 72b of locking member 72 together, sliding hole 44 over tabs 72a, 72b, and pressing vertical member in place so that hole 44 is captured by tabs 72a, 72b when they return to their normal resting position.

Raised edge 71 of vertical member 12 is inserted in indentation 69 of left side member 24, and pins 44a, 44b of vertical member 12 are inserted through holes 68a, 68b of left side member 24 and holes 73a, 73b of right side member 30, respectively, to provide structural support to assembled device 10.

Triangular upper hook 46, lower dual hook 48, and the plurality of hooks 50 are preferably configured to engage any type of hook or wire that can be attached to an object to be hung from a wall. For example, if an object that is to be hung from a wall by a wire strung across its back, or an alligator hook, or any other type of hook, the wire, alligator hook, or other type of hook can be inserted over hooks 46, 48, or 50 of device 10 for positioning on a wall.

Preferably, device 10 is unassembled when packaged and shipped, as shown in FIG. 1. Device 10 can be molded from plastic or metal or it can be made of wood or any other material having sufficient strength to support a picture or similar object. Hooks 46 and 50 can be made of any suitable material, such as plastic or metal. Similarly, dual hook 48 can be made of any suitable material, such as plastic or metal, and can be formed either as a single piece with opposed end hooks or as two separate hooks directly opposed to each other. Left and right side members 24, 30 can be connected to horizontal member 18 by any type of locking device. For example, if device 10 is formed of wood, then left and right side members 24, 30 can be connected to horizontal member 18 by screws.

Figure 10:
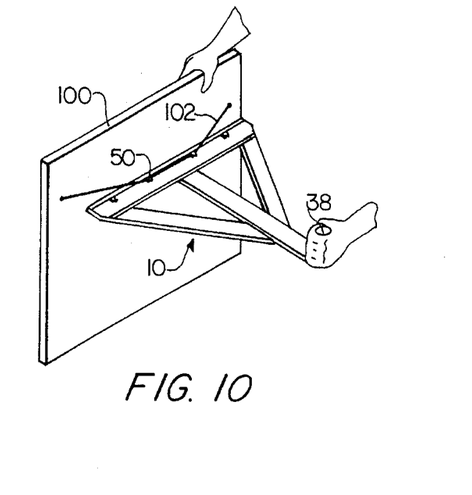
FIG. 10 illustrates positioning of a picture on the inventive device according to the first embodiment of the invention.
Figure 11:
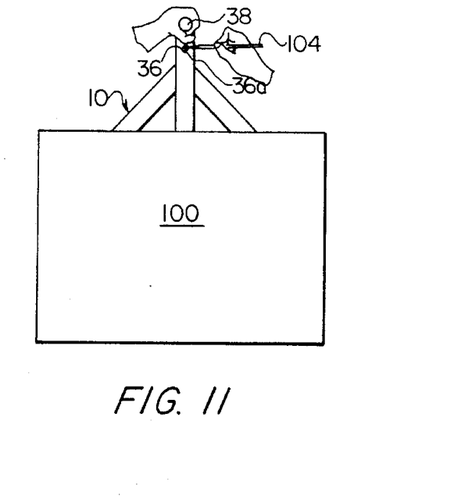
FIG. 11 illustrates positioning of the device and picture against a wall and marking the position of the vertical member scribe hole on the wall according to the first embodiment of the invention.
Figure 12:
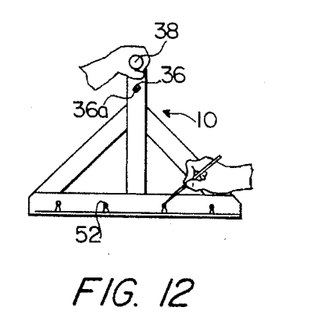
FIG. 12 illustrates marking aligned hanger positions on the wall according to the first embodiment of the invention.
Figure 13:
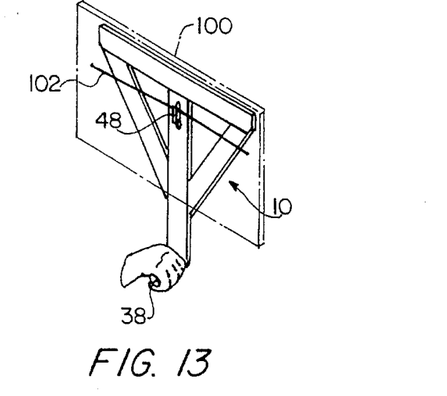
FIG. 13 illustrates positioning of a picture on the inventive device according to the second embodiment of the invention.

As shown in FIGS. 10, 11, and 12, to hang an object using assembled device 10 according to the first embodiment of the invention, preferably a stretched wire 102 is attached to two points on the back surface of an object 100 to be hung, such as a picture, mirror, or any other type of wall hanging. Object 100 is hung by stretched wire 102 from one or more hooks 50 of horizontal member 18, according to its size. Alternatively, any type of hook, such as an alligator hook, can be attached to the back surface of object 100, and object 100 can be hung from one or more hooks 50 by the hook attached to its back surface.

Device 10 and object 100 are then held against a wall at a desired location on the wall. Alternatively, if vertical member 12 is provided with bubble level 55, device 10 and object 100 can be held against the wall in a desired location and on a horizontal plane with respect to the wall by positioning device 10 against the wall such that air bubble 57 of bubble level 55 moves to a center window 59.

The position of scribe hole 36 is marked on the wall by inserting a marking utensil 104, such as an awl or a pencil, through scribe hole 36, leaving a mark 6a on the wall corresponding to the position of scribe hole 36. Object 100 is removed from device 10 and scribe hole 36 is aligned with mark 36a on the wall.

Alternatively, scribe hole 36 can be aligned with mark 36a on a horizontal plane with respect to the wall if either vertical member 12 or horizontal member 18 is provided with a bubble level 55 by using bubble level 55, as described above.

The positions of scribe holes 52 associated with hooks 50 from which the picture was hung are then marked on the wall by inserting marking utensil 104 through scribe holes 52. Hangers (not shown) can then be inserted into the wall at the aligned locations of the marks corresponding to the positions of scribe holes 52.

Figure 15A:
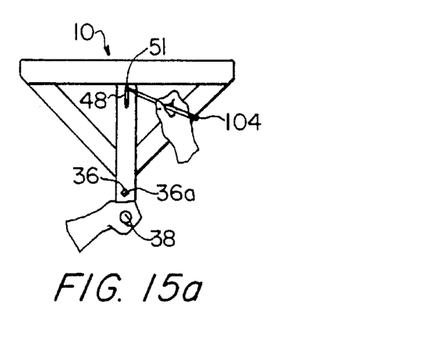
FIG. 15a illustrates marking aligned hanger positions on the wall according to the second embodiment of the invention.
Figures 15B, 16:
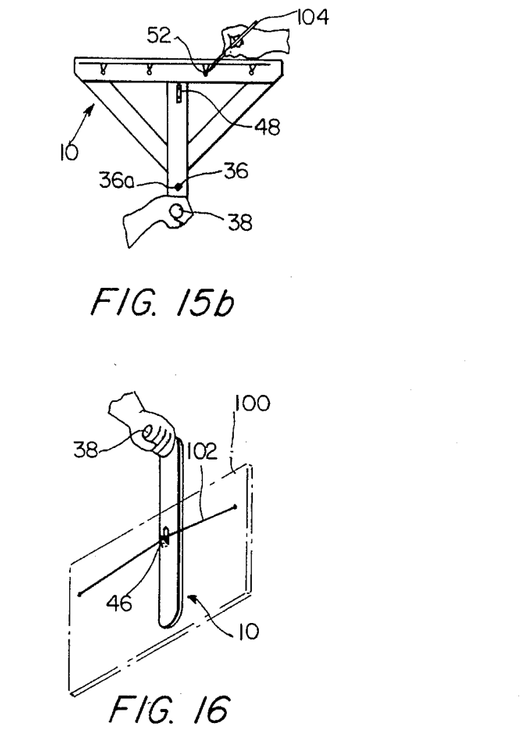
FIG. 15b illustrates marking scribe holes associated with hooks on the horizontal member in accordance with a first alternate embodiment of the second embodiment.
FIG. 16 illustrates positioning of a picture on the inventive device according to the third embodiment of the invention.

According to a second alternate embodiment of the first embodiment, aligned hanger positions can be marked on the wall using molded-in ruler 64 on horizontal member 18, as shown in FIG. 15b and discussed below, in relation to the second alternate embodiment of the second embodiment of the invention.

In a second embodiment, device 10 is inverted to hang object 100 close to a ceiling or in a tight space. As shown in FIGS. 13, 14, 15a, 15b, and 15c, device 10 is held by handle 38 and object 100 is hung by either wire 102 or any type of hook, as described above in relation to the first embodiment, from lower hook 48b of dual hook 48 on vertical member 12. Device 10 is held in a desired position on the wall.

Alternatively, according to the first alternate embodiment of the second embodiment of the invention, either vertical member 12 or horizontal member 18 is provided with bubble level 55, as shown in FIGS. 2a–2f. Device 10 can be held in a desired position and on a horizontal plane with respect to the wall by positioning device 10 against the wall such that air bubble 57 of bubble level 55 moves to a center window 59, as described in relation to the first embodiment, above.

Figure 14:
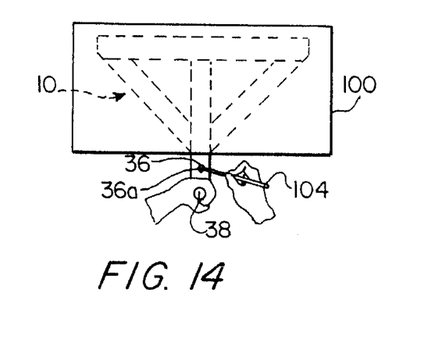
FIG. 14 illustrates positioning of the device and a picture against a wall and marking the position of the vertical member scribe hole on the wall according to the second embodiment of the invention.

The position of scribe hole 36 is marked on the wall by inserting marking utensil 104 through scribe hole 36, leaving a mark 36a on the wall corresponding to the position of scribe hole 36. Object 100 is then removed from device 10, device 10 is held against the wall in the desired position by aligning scribe hole 36 with mark 36a on the wall.

Further, according to the first alternate embodiment of the second embodiment, either vertical member 12 or horizontal member 18 is provided with a bubble level 55. Device 10 can be held against the wall in the desired position and on a horizontal plane with respect to the wall by aligning scribe hole 36 with mark 36a on the wall and using bubble level 55, as described above.

The position of scribe hole 51 corresponding to lower hook 48b of dual hook 48 is then marked on the wall by inserting marking utensil 104 through scribe hole 51.

As shown in FIG. 15a, in a second alternate embodiment of the second embodiment, aligned positions for two or more hangers can be determined and marked on the wall by inserting marking utensil 104 through selected scribe holes 52 on horizontal member 18.

As shown in FIG. 15b, in a third alternate embodiment of the second embodiment, aligned positions for two or more hangers can be determined and marked on the wall by using molded-in ruler 64 on horizontal member 18 to locate and mark desired hanger positions on the wall.

Figures 15C, 17:
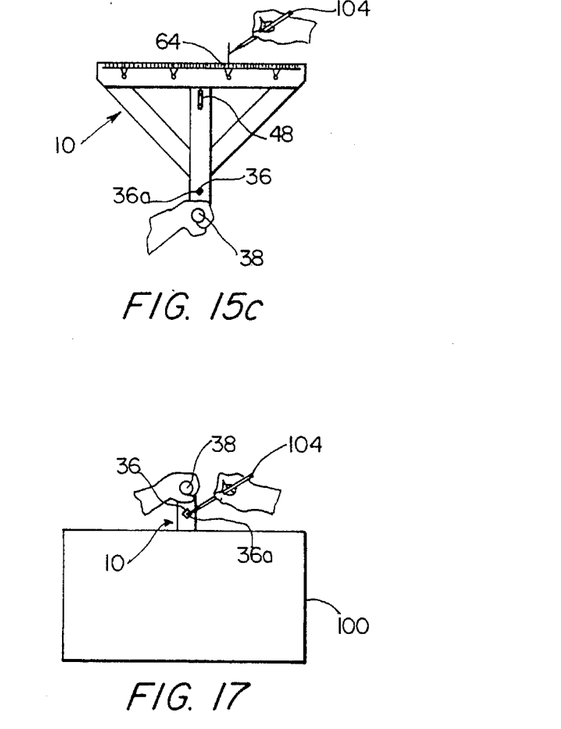
FIG. 15c illustrates marking aligned positions on a wall using a molded-in ruler on the horizontal member in accordance with a second alternate embodiment of the second embodiment.
FIG. 17 illustrates positioning of the device and picture against a wall and marking the position of the vertical member scribe hole on the wall according to the third embodiment of the invention.
Figure 18:
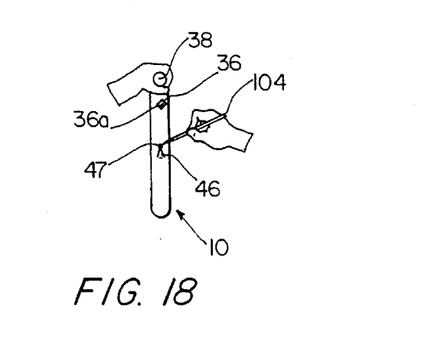
FIG. 18 illustrates marking a hanger position on the wall according to the third embodiment of the invention.

In a third embodiment, vertical member 12 is used alone to locate a desired position on a wall for a single hanger. As shown in FIGS. 16, 17, and 18 object 100 is hung by wire 100 or any other type of hook from either upper hook 46 or upper hook 48a of dual hook 48 on vertical member 12. Vertical member 12 is placed against a wall at a desired location.

Alternatively, according to the first alternate embodiment of the third embodiment, vertical member 12 is provided with bubble level 55, as shown in FIGS. 2a and 2b. Device 10 can be placed against the wall at the desired location and on a horizontal plane with respect to the wall using bubble level 55 by positioning device 10 against the wall such that air bubble 57 of bubble level 55 moves to a center window 59, as discussed above in relation to the first and second embodiments of the invention.

The position of scribe hole 36 is marked on the wall by inserting marking utensil 104 through scribe hole 36, leaving mark 36a on the wall corresponding to the position of scribe hole 36. Object 100 is then removed from device 10, device 10 is held against the wall in the desired position on a horizontal plane with respect to the wall by aligning scribe hole 36 with mark 36a.

Alternatively, according to the first alternate embodiment of the third embodiment, vertical member 12 is provided with bubble level 55, as discussed above. Device 10 is held against the wall in the desired position and on a horizontal plane with respect to the wall by aligning scribe hole 36 with mark 36a by positioning device 10 against the wall such that air bubble 57 of bubble level 55 moves to a center window 59, as discussed above in relation to the first and second embodiments of the invention.

Next, the desired hook location is marked on the wall by inserting marking utensil 104 through scribe hole 47 associated with upper hole 46 or scribe hole 49 associated with upper hook 48a of dual hook 48, depending on which hook was used to hang object 100. A hanger is then attached to the wall at the location of the scribe hole mark.

Figure 19:
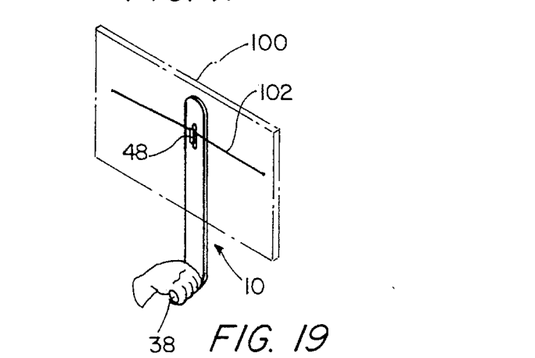
FIG. 19 illustrates positioning of a picture on the inventive device according to an alternate embodiment of the third embodiment of the invention, wherein the device is inverted.
Figure 20:
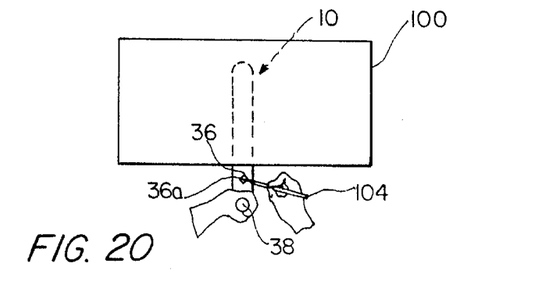
FIG. 20 illustrates positioning of the device and picture against a wall and marking the position of the vertical member scribe hole on the wall according to the alternate embodiment of the third embodiment of the invention.
Figure 21:
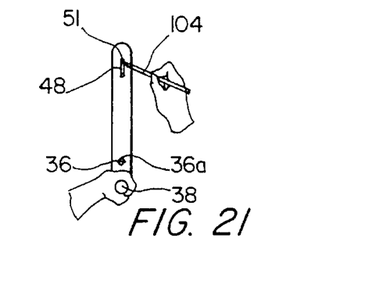
FIG. 21 illustrates marking a hanger position on the wall according to the alternate embodiment of the third embodiment of the invention.

In a second alternate embodiment to the third embodiment, as shown in FIGS. 19, 20, and 21, vertical member 12 can be inverted and object 100 can be hung on lower hook 48b of dual hook 48. Vertical member 12 is then placed against a wall at a desired location.

Alternatively, if vertical member 12 is provided with bubble level 55, as discussed above, it can be placed against the wall at the desired location and on a horizontal plane with respect to the wall by aligning scribe hole 36 with mark 36a by positioning device 10 against the wall such that air bubble 57 of bubble level 55 moves to a center window 59, as discussed above in relation to the first and second embodiments of the invention.

The position of scribe hole 36 is marked on the wall by inserting marking utensil 104 through scribe hole 36, leaving mark 36a on the wall corresponding to the position of scribe hole 36. Object 100 is then removed from device 10 and device 10 is held against the wall in the desired position by aligning scribe hole 36 with mark 36a.

Alternatively, if vertical member 12 is provided with bubble level 55, as discussed above, device 10 can be held against the wall in the desired position and on a horizontal plane with respect to the wall by aligning scribe hole 36 with mark 36a and using bubble level 55, as described above.

The desired hook location is then marked on the wall by inserting marking utensil 104 through scribe hole 51 associated with lower hook 48b. A hanger can then be attached to the wall at the location of the scribe hole mark.

Modifications and variations of the above-described embodiments of the present invention are possible, as appreciated by those skilled in the art in light of the above teachings.

It is therefore to be understood that, within the scope of the appended claims and their equivalents, the invention may be practiced otherwise than as specifically described.

What is claimed is:

1. A hanger aligning device comprising:
   an elongated vertical center member having a first scribe hole;
   an elongated horizontal member having a first end, a second end, a plurality of object-receiving hooks extending outwardly and upwardly therefrom, and a set of second scribe holes associated with the hooks; and
   a pair of elongated first and second side members, each side member having a top end and a bottom end, the top end of each side member being connected to the vertical member and the bottom ends of the first and second side members being connected to the first and second ends of the horizontal member, respectively.

2. The device of claim 1, further comprising a handle extending outwardly from the vertical member.

3. The device of claim 1, further comprising:
   a locking member at the top end of the second side member;
   first lock engaging means on the first side member configured to engage the locking member; and
   second lock engaging means on the vertical member configured to engage the locking member, whereby the first and second side members are connected to the vertical member.

4. The device of claim 1, further comprising:
   a pair of first and second locking members at the first and second ends of the horizontal member, respectively;
   first lock engaging means at the bottom end of the first side member configured to engage the first locking member; and
   second lock engaging means at the bottom end of the second side member configured to engage the second locking member, whereby the first and second side members are connected to the first and second ends of the horizontal member, respectively.

5. The device of claim 1, further comprising an object-receiving hook extending outwardly and upwardly from the vertical member and a scribe hole associated with the hook. vertical member, and upper and lower scribe holes associated with the upper and lower hooks, respectively.

6. The device of claim 5, further comprising an object-receiving dual hook extending outwardly from the vertical member, the dual hook having an upper hook extending outwardly and upwardly from the vertical member and a lower hook extending outwardly and downwardly from the vertical member, and upper and lower scribe holes associated with the upper and lower hooks, respectively.

7. The device of claim 1, wherein the vertical member has a bottom portion and the horizontal member further comprises a depression configured to receive the bottom portion of the vertical member.

8. The device of claim 1, wherein the horizontal member further comprises a molded-in ruler.

9. The device of claim 1, wherein the horizontal member further comprises a bubble level, whereby aligned hanger positions are marked on a wall on a horizontal plane with respect to the wall.

10. The device of claim 1, wherein the vertical member further comprises a bubble level, whereby aligned hanger positions are marked on a wall on a horizontal plane with respect to the wall.

11. A method for locating and aligning hangers on a wall comprising the steps of:
   providing a hanger aligning device comprising:
      an elongated vertical center member having a first scribe hole,
      an elongated horizontal member having a first end, a second end, a plurality of object-receiving hooks extending outwardly therefrom, and a set of second scribe holes associated with the hooks, and
      a pair of elongated first and second side members, each side member having a top end and a bottom end, the top end of each slide member being connected to the vertical member and the bottom ends of the first and second side members being connected to the first and second ends of the horizontal member, respectively;
   hanging an object from at least one of the hooks on the horizontal member;
   holding the device against a wall in a desired location;
   marking the wall by inserting a marking utensil through the first scribe hole, thereby making a first mark;
   removing the object from the device;
   aligning the first scribe hole of the vertical member with the first mark; and
   marking aligned hanger positions on the wall by inserting a marking utensil through the second scribe holes associated with each hook from which the object was hung, thereby making a set of second marks for locating and aligning hangers on the wall.

12. The method of claim 11, wherein the horizontal member of the hanger aligning device further comprises a bubble level, whereby aligned hanger positions are marked on the wall on a horizontal plane with respect to the wall.

13. The method of claim 11, wherein the vertical member of the hanger aligning device further comprises a bubble level, whereby aligned hanger positions are marked on the wall on a horizontal plane with respect to the wall.

14. A hanger aligning device for marking a single hanger position on a wall comprising an elongated vertical center member having an upper scribe hole, a stationary upper object-receiving hook extending outwardly and upwardly from the vertical member, a lower stationary object-receiving dual hook having an upper hook portion extending outwardly and upwardly from the vertical member and a lower hook portion extending outwardly and downwardly from the vertical member so that the device can be used in either an upright or an inverted position, and lower scribe holes associated with the upper object-receiving hook and the upper and lower hook portions of the lower object-receiving dual hook, so that a single hanger position corresponding to the position of the upper object-receiving hook or the upper or lower hook portion of the lower object-receiving dual hook can be marked on a wall.

15. The hanger aligning device of claim 14 wherein the vertical member further comprises a bubble level, whereby the hanger position is marked on the wall on a horizontal plane with respect to the wall.

16. The device of claim 14, further comprising a handle extending outwardly from the vertical member, whereby the vertical member can be held against a wall.

17. A method for locating hanger on a wall comprising the steps of:
   providing a hanger aligning device comprising an elongated vertical center member having a first scribe hole, an object-receiving dual hook having a lower hook extending outwardly and downwardly therefrom, and a second scribe hole associated with the lower hook;

inverting the device;

hanging an object from the lower hook;

holding the device against a wall in a desired location;

marking the wall through the first scribe hole, thereby making a first mark or the wall;

removing the object from the device;

aligning the first scribe hole of the elongated vertical center member with the first mark; and marking a hanger position on the wall by inserting a marking utensil through the second scribe hole associated with the lower hook from which the object was hung, thereby making a second scribe hole mark for locating a hanger on the wall.

18. The method of claim 17, wherein the vertical member of the hanger aligning device further comprises a bubble level, whereby the hanger position is marked on the wall on a horizontal plane with respect to the wall.

19. A method for locating and aligning hangers on a wall comprising the steps of:

providing a hanger aligning device comprising:

an elongated vertical center member having a first scribe hole and an object-receiving dual hook having a lower hook extending outwardly and downwardly from the vertical member and a lower scribe hole associated with the lower hook;

an elongated horizontal member having a first end, a second end, a plurality of object-receiving hooks extending outwardly therefrom, and a set of second scribe holes associated with the hooks; and a pair of elongated first and second side members, each side member having a top end and a bottom end, the top end of each side member being connected to the vertical member and the bottom ends of the first and second side members being connected to the first and second ends of the horizontal member, respectively;

inverting the hanger aligning device;

hanging an object from the lower hook on the vertical member;

holding the device against a wall in a desired location;

marking the wall by inserting a marking utensil through the first scribe hole, thereby making a first mark;

removing the object from the device;

aligning the first scribe hole of the vertical member with the first mark; and marking a hanger pollution on the wall by inserting a marking utensil through the lower scribe hole associated with the lower hook from which the object was hung, thereby making a second mark for locating a hanger on the wall.

20. The method of claim 19, wherein the horizontal member of the hanger aligning device further comprises a bubble level, whereby the hanger position is marked on the wall on a horizontal plane with respect to the wall.

21. The method of claim 19, wherein the vertical member of the hanger aligning device further comprises a bubble level, whereby the hanger position is marked on the wall on a horizontal plane with respect to the wall.

* * * * *